United States Patent [19]

Ready

[11] Patent Number: 5,801,620

[45] Date of Patent: Sep. 1, 1998

[54] FIRING RANGE SAFETY SIGNALING DEVICE

[75] Inventor: Patrick John Ready, Raleigh, N.C.

[73] Assignee: Ready Architectural Associates, Inc., Minneapolis, Minn.

[21] Appl. No.: 660,744

[22] Filed: Jun. 6, 1996

[51] Int. Cl.$^6$ ........................................ B60Q 1/00
[52] U.S. Cl. .................... 340/438; 340/469; 340/463; 340/468
[58] Field of Search .................... 340/438, 468, 340/463, 469; 362/61, 80

[56] References Cited

U.S. PATENT DOCUMENTS

| | | | |
|---|---|---|---|
| 1,980,037 | 11/1934 | Chase | 177/311 |
| 2,361,412 | 10/1944 | Paulus et al. | 177/337 |
| 3,258,763 | 6/1966 | Klein | 340/332 |
| 3,643,255 | 2/1972 | Barnard | 340/381 |
| 3,893,092 | 7/1975 | Kessler | 340/213.1 |
| 4,092,642 | 5/1978 | Green et al. | 340/413 |
| 4,134,660 | 1/1979 | Sakurada et al. | 354/289 |
| 4,184,146 | 1/1980 | Fratzke et al. | 340/52 F |
| 5,057,815 | 10/1991 | Smoot et al. | 340/468 |
| 5,103,204 | 4/1992 | Hartman | 340/332 |

*Primary Examiner*—Jeffery A. Hofsass
*Assistant Examiner*—Julie Lieu
*Attorney, Agent, or Firm*—Schwegman, Lundberg, Woessner and Kluth, P.A.

[57] ABSTRACT

A safety device for signaling various firing conditions for vehicles armed with guns includes an internal housing electrically connected to an external housing. Both the internal housing and the external housing have bulbs of various colors or lenses of various colors with bulbs behind the lenses. Various colors or combinations of colors are used to signal various firing conditions for the safety of personnel near a gun equipped military vehicle. The colors on the internal housing correspond to the colors on the external housing. Switches are located on the internal housing so that military personnel can produce a desired signal from the inside the gun equipped military vehicle. Each switch enables or turns "on" a light on the internal housing and the corresponding light on the external housing. This safety signaling device is most useful when military personnel have to perform exercises during the night hours. It is also thought that the safety signaling device will be most commonly used on military firing ranges set up for gun equipped military vehicles, but it is also contemplated that naval gunboats might also use the safety device when firing guns at night during naval exercises.

16 Claims, 5 Drawing Sheets

FIRING RANGE SAFETY SIGNALING DEVICE

FIELD OF THE INVENTION

The present invention is related to safety devices for firing ranges. In particular, the present invention is related to signaling device for use on a firing range.

BACKGROUND OF THE INVENTION

The military has many vehicles which include large guns. Such vehicles include tanks, Bradley fighting vehicles, and others. As part of normal exercises and training, personnel need to fire the guns on a firing range. Military personnel may need training in firing the guns, or they may need to test the guns, or they may need to calibrate the sights.

During daylight hours, a vehicle having a gun on a firing range displays colored flags to create a signal to allow personnel on the firing range to determine the amount of danger associated with a particular vehicle. Different colored flags in combination or by themselves signal different levels of danger and whether the vehicle is about to fire, aimed at a target, or is malfunctioning. Many times it is necessary to run these exercises in other than daylight hours. As night begins to fall, the signal flags' effectiveness deteriorates. At night, the signal flags are totally ineffective.

To signal various conditions at night, soldiers use military-issue flashlights which run on "D" cell batteries. In the past, soldiers obtained several flashlights for displaying the more important colors to allow sight identification of safe and dangerous conditions. However, there are many problems associated with using military-issue flashlights. For example, a green lens is necessary to signal a safe condition. Green filters are not issued with these flashlights so the soldiers have to use a green permanent marker to modify a clear lens so that it becomes a green filter. The same thing happens with other colors that are not issued. Another problem is that a constant supply of "D" cell batteries are required to run the flashlights. A "D" cell battery may not have a long life so during the course of a night exercise, the power output of the "D" cell battery may drop such that the quality of the signal becomes poor or nonexistent. The danger is that if a "D" cell runs out on a flashlight of a particular color, the absence of that color may then signal a safe condition when in fact personnel inside the military vehicle are actually in a condition which is more dangerous. The flashlights are also not easily mounted to a military vehicle and may fall off after several firings of the large gun associated with a particular vehicle. In addition, the switches on a flashlight are outside of the military vehicle so that personnel inside the vehicle have to climb out to assure that the condition being signaled is proper. Military personnel also have to climb out in order to change the signal by switching the appropriate flashlights on or off. This not only requires a loss of time but also endangers soldiers unnecessarily since they must crawl out of their vehicles onto unlit decks during the nighttime hours. In addition, going in and out of a vehicle on a firing range could lead to injury or loss of life from the dangerous firing conditions of other military vehicles. For example, a solider could crawl out of a tank to turn on the flashlights for an all-clear signal when an adjacent tank fires its guns. Such a situation could result in a hearing loss to the unwary soldier or even a loss of life.

Thus, there is a need for a signaling device which is visible at night and which can be operated from the interior of an armored vehicle. There is also a need for a device having a reliable power source so that the soldier's safety does not have to depend upon several flashlights and "D" cell batteries. There is also a need for a signaling unit that can be attached to an armored vehicle and which will stay attached after firing the gun associated with that vehicle.

SUMMARY OF THE INVENTION

The firing range safety signaling device provides for a reliable method to send clear signals of the various firing conditions during the nighttime hours on a firing range. The firing range safety signaling device, in its preferred embodiment, is operated from the inside of a tank, Bradley fighting vehicle, or other vehicle having a gun. The external portion of the signaling device can be securely mounted to a highly visible portion of a vehicle. The power supply that is used can be a larger source of power, such as that associated with the Bradley fighting vehicle or tank. The safety signaling device includes an external light array or housing and an internal light array or housing. The internal light array has lights with colors that correspond to the colors of the external light array. A switching mechanism is located on the internal housing so that when one switch is placed in the "on" position, either a single light or a set of lights is displayed. A label is placed on the housing by either painting or applying it with a self-adhesive film. This provides for added safety since the soldier merely has to match the light array as displayed on the interior of the military vehicle to the signaling guide or label to assure that the proper signal is being sent. When using the safety signaling device, soldiers do not have to go in and out of the tank and waste valuable range time checking on batteries or checking to see whether flashlights have fallen off the tank between firings.

BRIEF DESCRIPTION OF THE DRAWINGS

For a better understanding of the present invention, reference may be made to the accompanying drawings in which.

DESCRIPTION OF THE EMBODIMENT

In the following detailed description of the embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Figure 1:
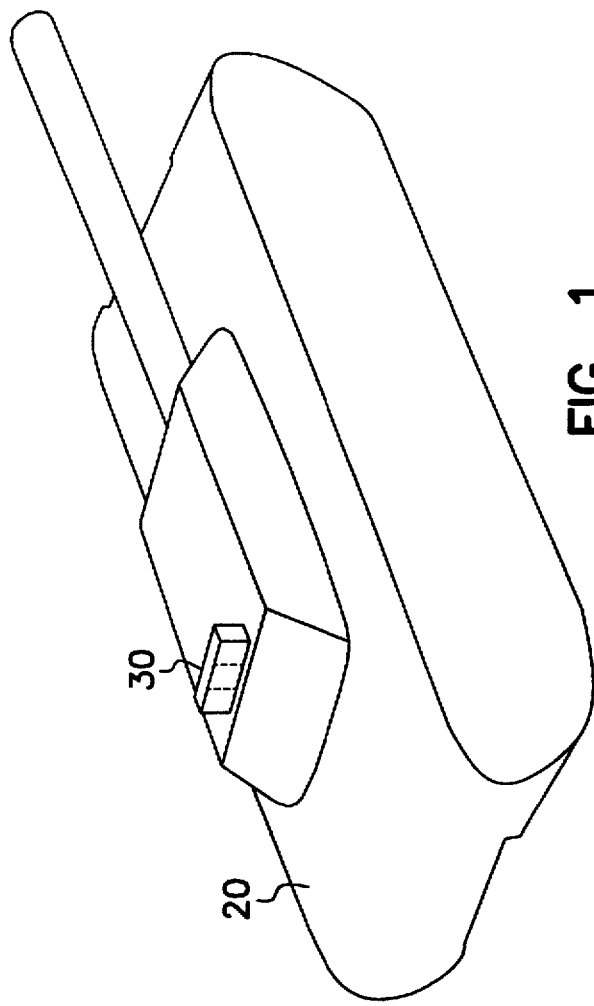
FIG. 1 is an isometric view of an armored military vehicle having the safety signaling device.

FIG. 1 shows an armored vehicle 20. The armored vehicle has an interior and an exterior. Mounted on the exterior of the armored vehicle at a visible location, preferably proximate the gunnery of the armored vehicle 20, is the external portion of the safety signaling device 30. The armored vehicle shown is a tank. It should be understood that any type of vehicle having weaponry would benefit from use of the safety signaling device 30. For example, the safety signaling device 30 would be useful for Bradley Fighting Vehicles, and Combat Engineering Vehicles. Another application of the safety signaling device would be during night Naval exercises on boats and ships.

The safety signaling device 30 is comprised of an external portion 32 and an internal portion 34. The external portion is comprised of a housing 36 which has a red lens 38, a green lens 40, and a yellow lens 42. The housing includes lights (not shown in FIG. 2 but shown in FIGS. 4 and 5) which are behind the red lens 38, the green lens 40, and the yellow lens 42. The housing 36 also includes a mounting bracket 44 for mounting the housing 36 to the armored vehicle or tank 20. The bracket 44 shown is a mechanical strap, however, it should be understood that the housing 36 could be mounted magnetically or could even be tied to the exterior of the tank 20. In addition, it should be understood that housing 36 which houses each of the colored signal lights could be comprised of separate housings for each of the colored lights. In addition, more than one such housing 36 could be mounted to the exterior and wired so that it operates in the same fashion as discussed below.

Figure 2:
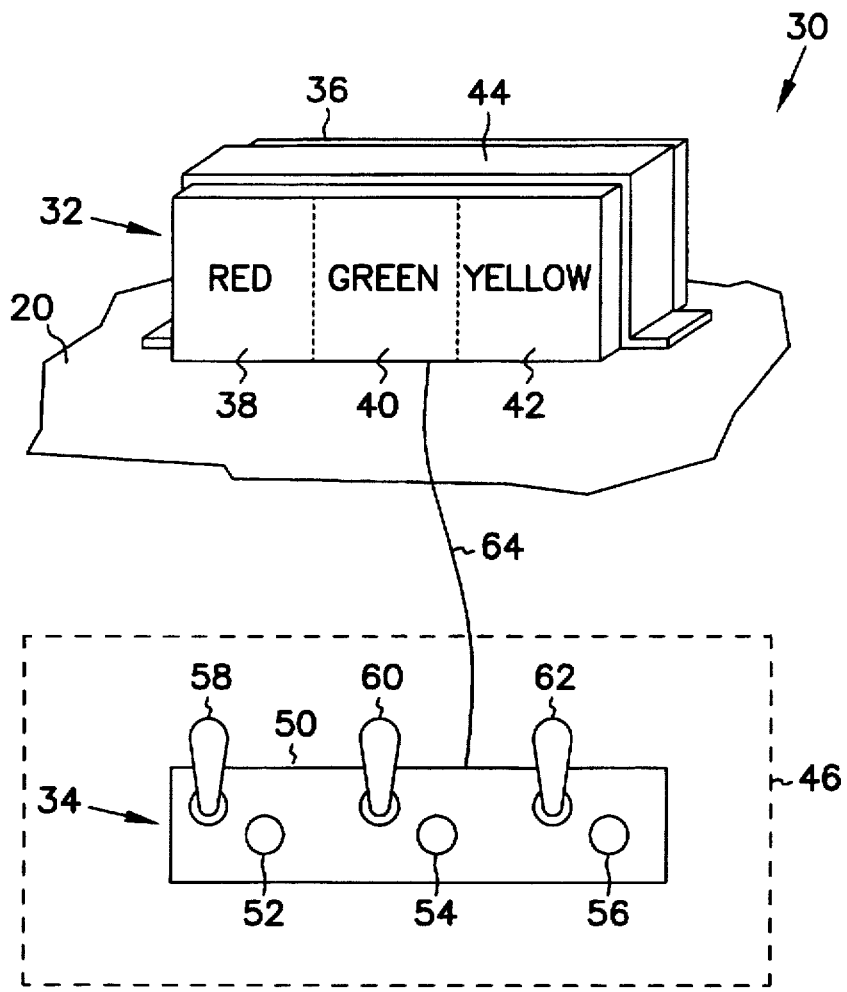
FIG. 2 is a block diagram of the safety signaling device.

The internal portion of the safety signaling device 34 is also shown in FIG. 2. The internal portion of the tank 20 is represented by the dotted line box 46 of FIG. 2. The internal portion of the safety signaling device 34 also includes a housing 50 which includes a red light 52, a green light 54 and a yellow light 56. The housing also includes several switches 58, 60, and 62. The interior portion of the safety signaling device 34 is also electrically connected to the external portion of the safety signaling device 32 by electrical line 64. The safety signaling device 30 is electrically connected to a power source (not shown in FIG. 2 but shown in FIGS. 4 and 5).

In operation, a firing condition can be signaled to the exterior of the vehicle 20 by opening or closing switches 58, 60, or 62. When the switches are closed, they allow power to illuminate, for example, the red light 52 inside the armored vehicle or tank 20 and also allow the red light 38 of the external housing 32 of the safety signaling device 30 to be illuminated. By putting the switches in various open and closed positions, various lights can be turned "on" or "off" to signal various conditions. Advantageously, military personnel inside the vehicle can easily note what light is on outside the vehicle by observing the red light 52, green light 54, and yellow light 56 inside the vehicle 20.

It should be noted that the electrical line 64 may be a heavy-duty electrical line which can be run from the exterior of the tank 20 to the interior through an opening in the turrent. Line 64 may be a line that runs through a smaller opening in the body of the tank 20. Furthermore, it should be noted that the housing 50 of the interior portion of the safety signaling device could be incorporated into a control panel on the interior of the tank. It is contemplated that all such armored vehicles may one day come equipped with the internal housing 34. Therefore, the internal portion of the safety signaling device 30 could be incorporated into the control panel on the inside of the tank or armored vehicle 20 in future designs.

Figure 3:
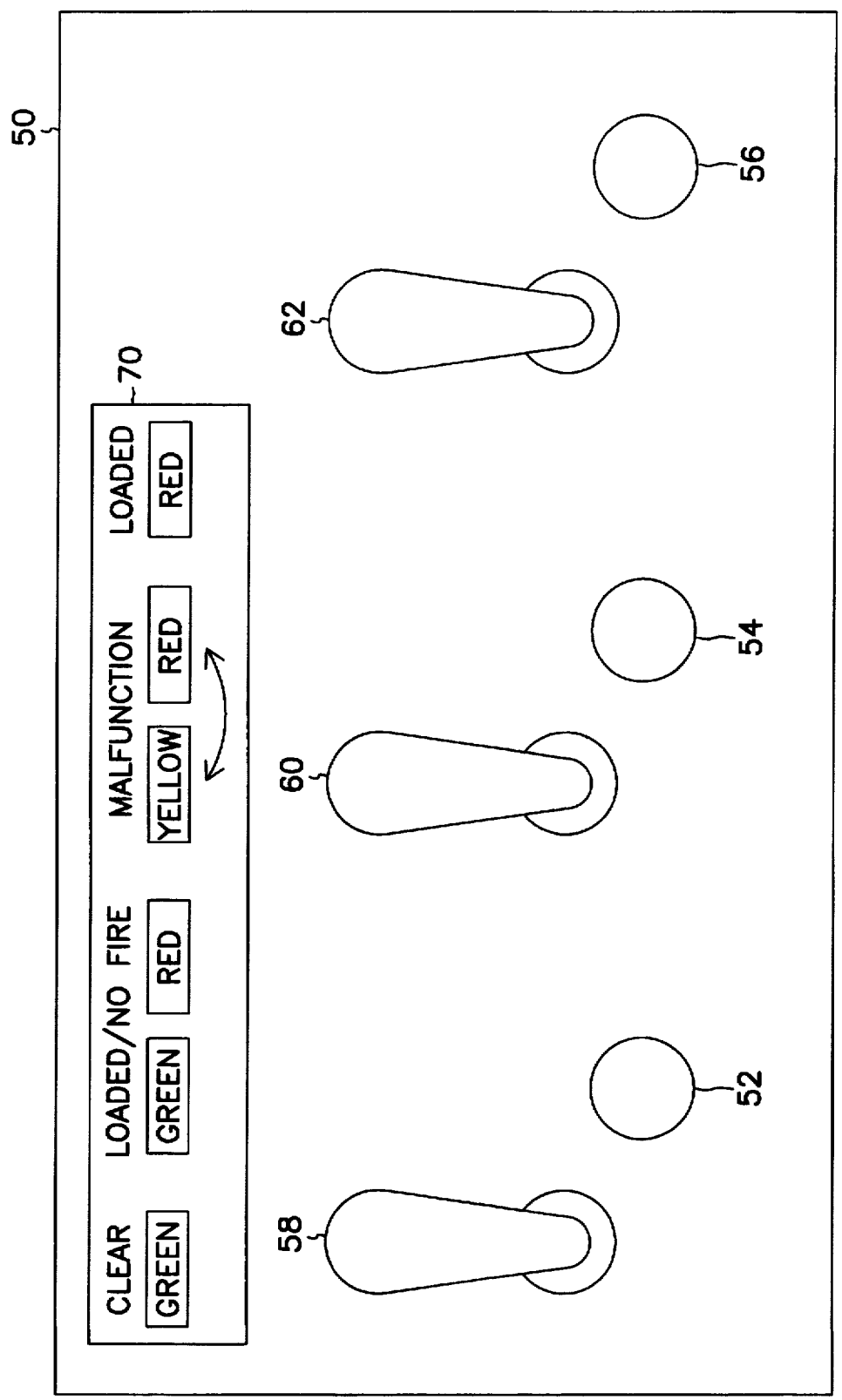
FIG. 3 is a block diagram of the portion of the safety signaling device that is located on the inside of the armored military vehicle.

FIG. 3 shows an internal housing 50 which has the red interior light 52, green interior light 54 and yellow interior light 56 as well as switches 58, 60 and 62 exactly like the interior housing shown in FIG. 2. In addition, attached to the housing is a label 70. The label 70 contains the various color combinations of lights which signal the various conditions. The label 70 is a signaling guide which associates specific firing conditions with the colored lights or combination of colored lights displayed both inside and outside the vehicle 20. The various firing conditions as signaled by a single colored light or a combination of colored lights is set forth in the table below:

| Firing Conditions | Lights |
|---|---|
| Clear | Green |
| Loaded/No Fire | Green and Red |
| Malfunction | Yellow and Red |
| Loaded | Red |

Advantageously, the label 70 is located near the switches and lights of the housing 50 of the interior portion of the safety signaling device. A soldier using the device can merely look at the label to determine which lights should be illuminated to indicate a specific firing condition. He or she can then assure that the proper firing condition is being signaled by inspecting the lights on the housing 50 of the internal portion 34 of the safety signaling device 30. The use of a label enhances the safety of the safety signaling device since the soldier inside the vehicle does not have to find a separate manual to double check or assure that the proper firing condition is being signaled. It is contemplated that the label 70 could be a plastic or metal plate that is attached to the interior of the tank or armored vehicle 20 or that it could be painted on the interior surface of the tank near the switches and lights in a control panel.

Figure 4:
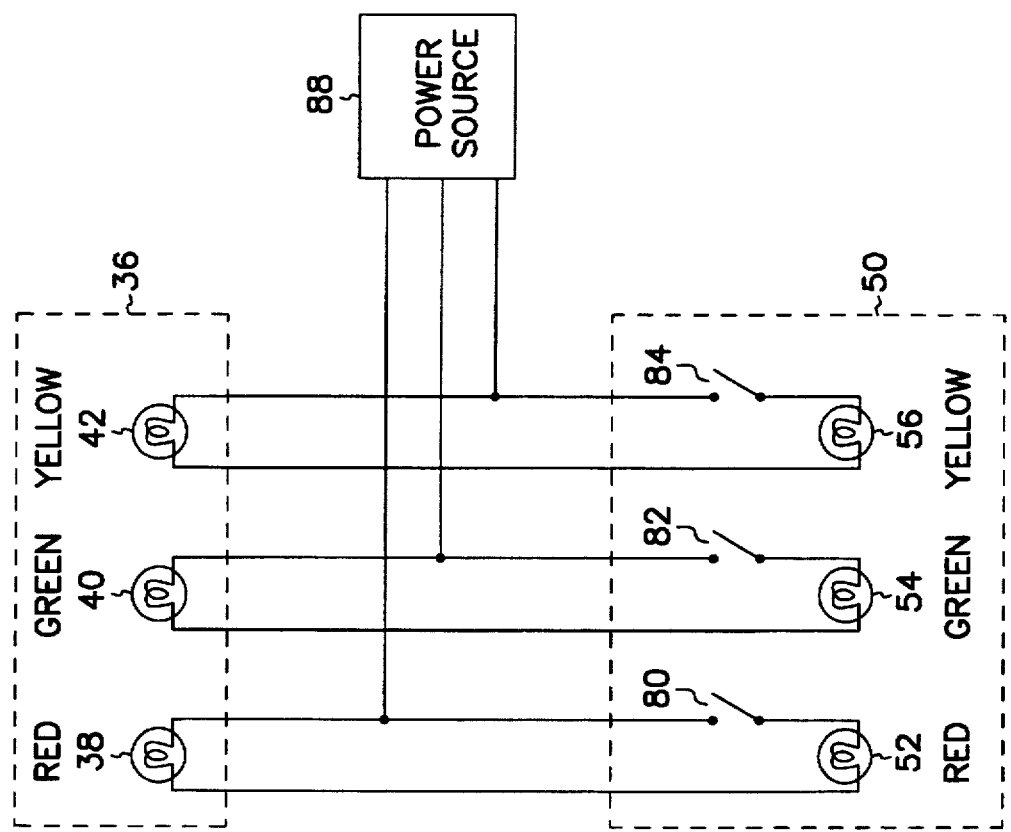
FIG. 4 is a circuit diagram of one embodiment of the safety signaling for the armored military vehicle.
Figure 5:
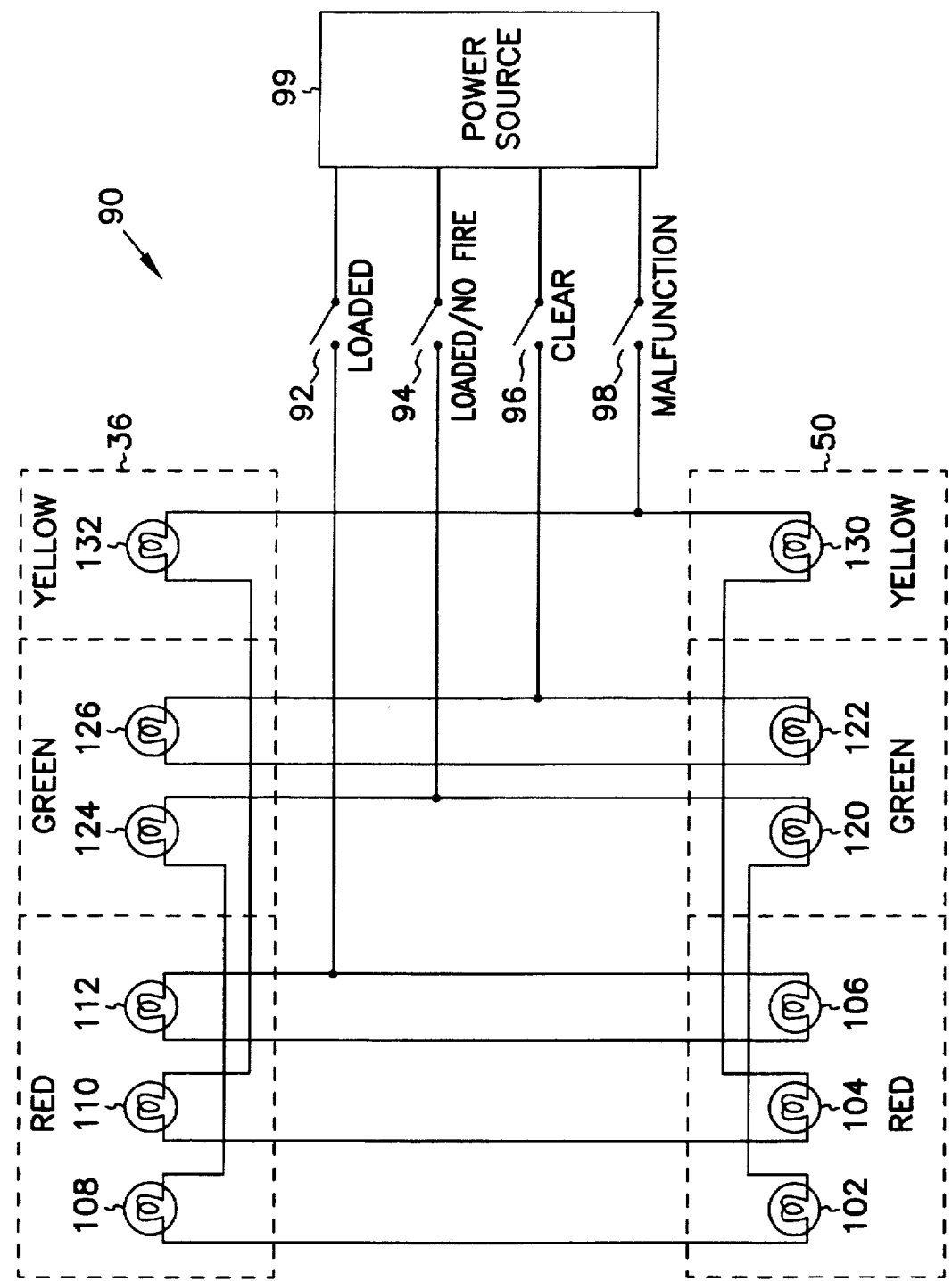
FIG. 5 is a circuit diagram of another embodiment of the safety signaling for the armored military vehicle.

FIGS. 4 and 5 show two separate wiring diagrams for two preferred embodiments of this invention. In one preferred embodiment, shown in FIG. 4, each colored bulb is turned on by a separate switch. For purposes of this discussion, a colored bulb or colored light is the same as a clear bulb located behind a colored lens. For example, internal red light 52 and external red light 38 are turned on by closing switch 80. Internal green bulb 54 and external green light 40 are illuminated when switch 82 is closed. Finally, internal yellow bulb 56 and external yellow bulb 42 are illuminated when switch 84 is closed. Thus, each switch 80, 82 and 84 controls the illumination of a single respective color used for signaling firing conditions. Each of the bulbs is attached to a power source 88 which could be a large DC battery or an electrical generator which may be used within the armored tank or armored vehicle 20.

FIG. 5 shows another preferred embodiment shown as circuit diagram 90. An overview of the operation of this preferred embodiment is thought to help simplify the explanation of the circuit diagram. The essence of this embodiment is that a single switch can be closed to produce the proper combination of lights to signal various firing conditions. In other words, to signal a condition that has a combination of lights, one switch needs to be enabled.

FIG. 5 shows an external housing 36 in dotted lines and an internal housing 50 also in dotted lines. In this particular embodiment, there are six red bulbs 102, 104, 106, 108, 110 and 112. There are four green bulbs 120, 122, 124, and 126, and there are two yellow bulbs 130 and 132. All of the bulbs are connected to a power source 99. In this particular embodiment, there are four switches 92 which when enabled, indicates the loaded firing condition shown in the table above, and switch 94 which enables the loaded/no fire combination of lights when it is enabled, switch 96 which enables a combination of lights indicating the clear firing condition and switch 98 which when enabled, illuminates the lights in combination which indicates a malfunction in the firing condition. It is contemplated that in this embodiment, a mechanical switch that allows only one of the switches 92, 94, 96 or 98 to be closed at any given time will be employed.

As is well known in the art, a logic circuit could be used in place of such a mechanical switch. Now looking at the FIG. 5, when the switch 92 is closed, power from the power source is provided to red light bulbs 106 and 112, one of which is on the interior of the tank 20 and one which is on the exterior in housing 36. The red only bulb signals the "loaded" condition. When switch 94 is closed, power is provided to green light bulbs 120 and 124 as well as the red light bulbs 102 and 108. The green and red combination is the combination of lights signaling a "loaded/no firing condition". When switch 96 is closed, green lights 122 and 126 are illuminated. This indicates a "clear firing condition", both inside and outside of the tank or vehicle. Finally, when the switch 98 is closed, yellow lamp 130 and yellow lamp 132, as well as red lamp 104 and 110 are illuminated. This provides a "malfunction" firing signal, both inside and outside of the tank. It is contemplated that a label similar to the one shown in FIG. 3 could be used with this particular embodiment. The label would be different in that it would merely indicate that by closing one switch, a particular firing condition would be displayed. Advantageously, the lights inside the tank or Bradley fighting vehicle 20 would be illuminated in the same combination, both inside and outside of the tank.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A safety apparatus for use with an armored vehicle having attached guns, said safety apparatus for use on a firing range for an armored vehicle with attached guns, said safety apparatus comprising:

a first set of colored signal lights located on the outside of the vehicle, each of said lights visually distinguishable from one another across the firing range, and;

a second set of colored signal lights located inside the vehicle, said second set of colored lights having colors which correspond to the colors in the first set of colored lights;

a set of switches, each switch for signaling a specific firing condition wherein some of the switches of said set of switches control the illumination of a combination of selected colors of the first set of colored lights and the same combination of selected colors of the second set of colored lights to signal the specific firing condition inside and outside the vehicle.

2. The safety apparatus for use with an armored vehicle having guns of claim 1 further comprising a signaling guide positioned inside the armored vehicle which associates specific firing conditions with displaying a single colored light or a combination of colored lights.

3. The safety apparatus for use with an armored vehicle having guns of claim 2 wherein the signaling guide is located near the set of switches located inside the vehicle.

4. The safety apparatus for use with an armored vehicle having guns of claim 2 wherein the signaling guide is a label located near the set of switches located inside the vehicle.

5. The safety apparatus for use with an armored vehicle having guns of claim 2 wherein the signaling guide is painted on a surface located near the set of switches located inside the vehicle.

6. The safety apparatus for use with an armored vehicle having guns of claim 1 further comprising a housing for each color of light of the first colored set of lights.

7. The safety apparatus for use with an armored vehicle having guns of claim 1 further comprising a housing for the first colored set of lights.

8. The safety apparatus for use with an armored vehicle having guns of claim 1 further comprising a signaling guide which associates specific firing conditions with each switch of said set of switches, each switch controlling the illumination of a single colored light of said first and second set of colored lights or a combination of colored lights of said first and second set of colored lights to signal a firing condition inside and outside the armored vehicle.

9. The safety apparatus for use with an armored vehicle having guns of claim 8 wherein the signaling guide is located near the set of switches located inside the vehicle.

10. The safety apparatus for use with an armored vehicle having guns of claim 8 wherein the signaling guide is a label located near the set of switches located inside the vehicle.

11. The safety apparatus for use with an armored vehicle having guns of claim 8 wherein the signaling guide is painted on a surface located near the set of switches located inside the vehicle.

12. The safety apparatus for use with vehicles having guns of claim 8 further comprising a housing adapted for placing on the exterior or the armored vehicle for the first colored set of lights.

13. The safety apparatus for use with an armored vehicle having guns of claim 12 further comprising a mount for mounting the housing to the outside of the vehicle.

14. A method for signaling firing conditions for an armored vehicle having guns attached thereto, while said armored is on a firing range, said method comprising the steps of:

locating a first set of colored lights on the outside of the vehicle;

locating a second set of colored lights on the inside of the vehicle; and switching on one switch of a set of switches to signal a firing condition, wherein some of said switches of said first set of switches control the illumination of a combination of colored lights in the first set of lights and the same combination of colored lights in the second set of lights to signal the same firing condition outside and inside the vehicle.

15. The method for signaling firing conditions from an armored vehicle having guns attached thereto of claim 14 further comprising the step of locating a signaling guide near the switch mechanism, the signaling guide associating each switch of said set of switches with a specific firing condition.

16. The safety apparatus for use with an armored vehicle having attached guns of claim 1 wherein said first set of colored signal lights located outside the vehicle is comprised of a plurality of separate colored lights.

* * * * *